(12) United States Patent
Katayama et al.

(10) Patent No.: US 6,654,744 B2
(45) Date of Patent: Nov. 25, 2003

(54) METHOD AND APPARATUS FOR CATEGORIZING INFORMATION, AND A COMPUTER PRODUCT

(75) Inventors: Yoshinori Katayama, Kawasaki (JP); Kanji Uchino, Kawasaki (JP); Norihiko Sakamoto, Shizuoka (JP); Ryu Shibata, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 214 days.

(21) Appl. No.: 09/776,635

(22) Filed: Feb. 6, 2001

(65) Prior Publication Data

US 2002/0069197 A1 Jun. 6, 2002

(30) Foreign Application Priority Data

Apr. 17, 2000 (JP) ........................................ 2000-115669

(51) Int. Cl.[7] .......................... G06F 17/30; G06F 17/00
(52) U.S. Cl. ........................................... 707/7; 707/100
(58) Field of Search ............................ 707/1–5, 7, 10, 707/100, 500, 200

(56) References Cited

U.S. PATENT DOCUMENTS

| | | | |
|---|---|---|---|
| 5,306,154 A | * | 4/1994 | Ujita et al. ................. 434/218 |
| 5,887,088 A | * | 3/1999 | Kurokawa et al. .......... 382/317 |
| 2001/0020238 A1 | * | 9/2001 | Tsuda ............................ 707/5 |

FOREIGN PATENT DOCUMENTS

| | | |
|---|---|---|
| GB | 2261306 A | 5/1993 |
| JP | HEI 11-161671 A | 6/1999 |
| JP | HEI 11-167581 A | 6/1999 |
| JP | HEI 11-296552 A | 10/1999 |
| JP | HEI 11-328211 A | 11/1999 |
| JP | 2000-259658 A | 9/2000 |

OTHER PUBLICATIONS

Fabrizio Sebastiani, "Machine Learning in Automated Text Categorisation", Consiglio Nazionale delle Ricerche, Italy.

* cited by examiner

Primary Examiner—Alford Kindred
(74) Attorney, Agent, or Firm—Staas & Halsey LLP

(57) ABSTRACT

The information categorizing apparatus comprises a feature element extraction section which extracts a feature element for each categorizing category from a plurality of sample texts included in the categorizing sample data in which a sample text group and a plurality of categories are associated with each other in advance. Further, a categorizing method determination section determines a categorizing method based on the categorizing sample data. A categorizing learning information generation section generates categorizing learning information representing a feature for each category, based on the extracted feature elements, in accordance with the determined categorizing method. An automatic categorizing section categorizes a new text group to be categorized for each category, in accordance with the determined categorizing method and the categorizing learning information.

11 Claims, 18 Drawing Sheets

FIG.2 text 1 — TX₁ — 80

NEW PLANT IN PHILIPPINES COMPLETED.
ASIA TRANSMISION (ATC, RAGNA STATE), A JOINT VENTURE FOR MANUFACTURING VEHICLE ENGINE/TRANSMISSION OF XXX AUTOMOBILES PLANT IN PHILIPPINES WILL HOLD A COMMEMORATIVE CEREMONY FOR CELEBRATING COMPLETION OF NEW PLANT AND THE 25TH ANNIVERSARY OF THE FOUNDING OF THE PLANT AT THE SITE ON 29TH.

⋮ text 2 — TX₂

SKYROCKETING YEN, RUSH INTO THE FIRST 80-YEN MARK, BREAK THE HIGHEST VALUE WITH UNCHALLENGED STRONG YEN
  IN TOKYO FOREIGN EXCHANGE MARKET IN THE MORNING ON 10TH AT BEGINNING OF THE WEEK, THE TENDENCY OF YEN BUYING/DOLLAR SELLING WAS FURTHER ACCELERATED. THE EXCHANGE RATE OF THE YEN WAS SKYROCKETED TO $1 = FIRST HALF OF 80 YEN. THE EXCHANGE RATE OF THE YEN ONCE REACHED 80.15 YEN, WHICH SHOWED STRONGER YEN/WEAKER DOLLAR OF 4 YEN HIGHER THAN THE LAST WEEKEND'S RATE, AND BROKE THE HIGHEST VALUE IN THE WORLD MARKET. SPECULATORS WHO TOOK ADVANTAGE OF THE WEAKNESS IN THE COOPERATIVE STRUCTURE OF JAPAN, USA AND EUROPEAN COUNTRIES WHICH TRY TO HOLD OFF THE STRONG YEN/WEAK DOLLAR TENDENCY ARE BUYING YEN WITH RESPECT TO DOLLAR AND MARK. YEN ALSO BROKE THE HIGHEST VALUE WITH RESPECT TO THE MARK, TAKING ON THE UNCHALLENGED STRONG ASPECT.

⋮ text 10 — TX₁₀

100 text1 : AUTOMOTIVE_INDUSTRY 85
text2 : ECONOMIC 95
text3 : AUTOMOTIVE_INDUSTRY 83
text4 : COMMUNICATIONS_TECHNOLOGIES 81
text5 : COMPUTERS 68
text6 : CONSUMER_ELECTRONICS 75
text7 : ELECTRONICS_INDUSTRY 84
text8 : ENGINEERING 98
text9 : FINANCIAL_SERVICES 78
text10 : HOUSEHOLD 69
text11 : ELECTRONICS_INDUSTRY 83
text12 : COMPUTERS 89
text13 : AUTOMOTIVE_INDUSTRY 86
text14 : COMPUTERS 82
text15 : ECONOMIC 87
text16 : COMMUNICATIONS_TECHNOLOGIES 84
text17 : ELECTRONICS_INDUSTRY 79
text18 : ELECTRONICS_INDUSTRY 82
text19 : ENGINEERING 75
text20 : HOUSEHOLD 68
. . .

FIG.4

LABELS: DOLLAR, YEN, MARKET, SEN, STRONG YEN, %, PRESIDENT, RICE
26

LABELS: YEN, DOLLAR, SEN, MARKET, STRONG YEN, PREVIOUS DAY, SELLING, SUDDEN FALL
15

LABELS: %, BUSINESS ACTIVITY, OFFICIAL RATE, BANK OF JAPAN, RECOVERY, INTEREST, GUIDANCE, EASE
5

LABELS: STAND, % INCREASE, PUNISHMENT, PREVIOUS YEAR, PERSONAL COMPUTER, LUXURY CAR, NUMBER, SHIPMENT
2

LABELS: BUYING AND SELLING, ORDER, STOCK-MINI-INVESTMENT, INTERNET, ACCOUNT, XXXX, UNIT, DEALING
2

LABELS: PRESIDENT, OPERATION, WHITE HOUSE, PAGE, VIETNAM, XXXX, THE REPUBLICAN PARTY, INTERNET
1

LABELS: CATV, TWO-WAY, MAINTENANCE, OPTICAL FIBER NETWORK, ACQUISITION, TELEPHONE COMPANY, ACQUISITION, BELL
1

FIG.11

| | ECONOMIC (27text) | FREQUENCY | FOREIGN (43text) | FREQUENCY | | SOCIETY (47text) | FREQUENCY | SPORTS (28text) | FREQUENCY $R_1$ |
|---|---|---|---|---|---|---|---|---|---|
| 1 | MARKET | 61 | RICE | 67 | | EARTHQUAKE | 60 | YAMADA | 96 |
| 2 | STRONG YEN | 40 | PRESIDENT | 55 | | KOBE-CITY | 52 | MAJOR LEAGUES | 45 |
| 3 | DOLLER | 38 | JAPAN | 44 | | DEATH | 45 | PITCHER | 42 |
| 4 | YEN | 35 | COOPERATION | 41 | | TOKYO | 38 | RICE | 36 |
| 5 | RICE | 35 | GOVERNMENT | 40 | | AWAJI | 37 | ALL STAR | 31 |
| 6 | BUSINESS ACTIVITY | 21 | POLITICAL POWER | 37 | | ABOVE | 36 | STARTER | 28 |
| 7 | JAPAN | 21 | USA | 33 | | ACTIVITY | 36 | STRIKEOUT | 27 |
| 8 | USA | 21 | ELECTION | 30 | | HANSHIN | 35 | PLAYER | 27 |
| 9 | MORNING | 20 | THE REPUBLICAN PARTY | 27 | | COLLAPSE | 34 | LEAGUE | 24 |
| 10 | BANK OF JAPAN | 20 | CHINA | 26 | | OCCURRENCE | 32 | COOPERATION | 21 |
| 11 | STOCK | 19 | CIVILIANS | 22 | | PART | 29 | HERO | 20 |
| 12 | SUDDEN FALL | 19 | CRINTON | 19 | | HYOGO PREF. | 28 | GAME | 20 |
| 13 | PREVIOUS DAY | 19 | RELATION | 19 | | MORNING | 27 | USA | 18 |
| 14 | TOKYO | 19 | CANDIDATE | 18 | | VOLUNTEER | 26 | DODGERS | 16 |
| 15 | DEALING | 17 | PARTY | 18 | | DEFENDANT | 25 | DREAM | 16 |
| 16 | AREA | 17 | PROBLEM | 18 | | INSTALLATION | 23 | ENTREE | 15 |
| 17 | WEAK YEN | 16 | ECONOMY | 17 | | DEAD | 22 | BASEBALL | 15 |
| 18 | INTERVENTION | 16 | DOLE | 15 | | PERSON | 22 | STRIKE OUT | 14 |
| 19 | ECONOMY | 16 | RUSSIA | 15 | | GROUP | 22 | JAPAN | 14 |
| 20 | NEW YORK | 15 | WASHINGTON | 15 | | EVENT | 21 | TV | 13 |
| 21 | RECOVERY | 15 | NEGOTIATION | 15 | | BELIEVER | 21 | TORNADO | 12 |
| 22 | DEFICIT | 15 | HOUSE OF REPRESENTATIVES | 14 | | SEISMIC INTENSITY | 21 | FAN | 12 |
| 23 | INVESTMENT | 15 | PROBABILITY | 14 | | BURYING ALIVE | 21 | THE ENTIRE UNITED STATES | 12 |
| 24 | ANNOUNCEMENT | 15 | ATOMIC BOMB | 14 | | NISHINOMIYA-CITY | 21 | TEXAS | 10 |
| 25 | WEAK DOLLAR | 14 | OPERATION | 14 | | BUILDING | 20 | LOST POINT | 10 |
| 26 | STOCK | 13 | STATE | 14 | | PREFECTURAL POLICE | 20 | ARLINGTON | 9 |
| 27 | ENTERPRISE | 13 | FRANCE | 13 | | SUFFERING DISASTER | 20 | MOUND | 9 |
| 28 | DOW | 12 | CONFERENCE | 13 | | SUPPORT | 19 | TOP | 8 |
| 29 | FALL | 12 | CHAIRMAN | 13 | | KOBE | 19 | HIT | 8 |
| 30 | FINANCE | 12 | MILITARY AFFAIRS | 13 | | CENTER | 19 | ALL-STAR GAME | 8 |

FIG.12

| | FREQUENCY | | FREQUENCY | | FREQUENCY | | FREQUENCY $R_2$ |
|---|---|---|---|---|---|---|---|
| | ECONOMIC | | FOREIGN | | SOCIETY | | SPORTS |
| | 27text | | 43text | | 47text | | 28text |
| 1 | MARKET | 63 | PRESIDENT | 73 | EARTHQUAKE | 66 | YAMADA | 97 |
| 2 | STRONG YEN | 40 | POLITICAL POWER | 37 | KOBE-CITY | 52 | MAJOR LEAGUES | 48 |
| 3 | STOCK | 24 | THE REPUBLICAN PARTY | 29 | DEATH | 45 | PITCHER | 43 |
| 4 | SUDDEN FALL | 19 | RICE | 64 | AWAJI | 37 | ALL STAR | 32 |
| 5 | BUSINESS ACTIVITY | 21 | CHINA | 27 | COLLAPSE | 34 | STRIKEOUT | 30 |
| 6 | BANK OF JAPAN | 20 | ELECTION | 31 | HANSHIN | 38 | STARTER | 29 |
| 7 | DEALING | 19 | GOVERNMENT | 41 | TOWN | 37 | PLAYER | 27 |
| 8 | WEAK DOLLAR | 16 | CRINTON | 22 | ACTIVITY | 38 | LEAGUE | 25 |
| 9 | WEAK YEN | 16 | CIVILIANS | 22 | BURYING ALIVE | 27 | HERO | 21 |
| 10 | INTERVENTION | 16 | FRANCE | 15 | OCCURRENCE | 33 | GAME | 20 |
| 11 | STOCK | 15 | COOPERATION | 40 | VOLUNTEER | 29 | DREAM | 16 |
| 12 | DEFICIT | 15 | RUSSIA | 15 | HYOGO PREF. | 28 | BASEBALL | 15 |
| 13 | FINAL VALUE | 13 | OPERATION | 14 | DEFENDANT | 25 | ENTREE | 15 |
| 14 | REMITTANCE | 13 | GROUP | 14 | NISHINOMIYA-CITY | 22 | STRIKE OUT | 15 |
| 15 | INVESTMENT | 15 | HOUSE OF REPRESENTATIVES | 14 | TOKYO | 38 | FAN | 13 |
| 16 | FALL | 12 | JAPAN | 44 | SEISMIC INTENSITY | 21 | RICE | 35 |
| 17 | DOW | 12 | RELATION | 21 | DEAD | 22 | THE ENTIRE UNITED STATES | 13 |
| 18 | RECOVERY | 16 | WASHINGTON | 18 | DRIVING | 20 | MOUND | 10 |
| 19 | AREA | 18 | CANDIDATE | 19 | PREFECTURAL POLICE | 20 | LOST POINT | 10 |
| 20 | EXPORT | 13 | PRESIDENT (OF TAIWAN) | 12 | BUILDING | 20 | TEXAS | 10 |
| 21 | BUYING AND SELLING | 12 | CHAIRMAN | 15 | BELIEVER | 21 | JAPANESE | 10 |
| 22 | MARKET PRICE | 11 | SOUTHEAST ASIA | 11 | KOBE | 19 | HIT | 8 |
| 23 | NEW YORK | 16 | VIETNAM | 11 | TOKYO METROPOLITAN POLICE DEPARTMENT | 18 | GOING TO THE MOUND | 8 |
| 24 | ORDER | 12 | MILITARY AFFAIRS | 12 | DAMAGE | 19 | ALL-STAR GAME | 8 |
| 25 | UPDATE | 11 | USA | 33 | SUFFERING DISASTER | 20 | PITCH | 8 |
| 26 | PREVIOUS WEEK | 10 | NUCLEAR TEST | 11 | EVENT | 22 | COOPERATION | 22 |
| 27 | SKYROCKET | 10 | ATOMIC BOMB | 14 | POWER FAILURE | 16 | HARD PITCHING | 7 |
| 28 | BANK | 11 | CONTRAVENTION | 15 | DOCTRINE | 18 | HOME RUN | 7 |
| 29 | ECONOMY | 17 | KOREA | 11 | KINKI | 19 | SUPERSTAR | 7 |
| 30 | STOCK MARKET | 10 | EC | 10 | KU | 21 | JOHNSON | 7 |

FIG.13

| | ECONOMIC | FREQUENCY | FOREIGN | FREQUENCY | | SOCIETY | FREQUENCY | SPORTS | FREQUENCY $R_3$ |
|---|---|---|---|---|---|---|---|---|---|
| | 27text | | 43text | | | 47text | | 28text | |
| 1 | MARKET | 63 | PRESIDENT | 73 | | EARTHQUAKE | 66 | NOMO | 97 |
| 2 | STRONG YEN | 40 | POLITICAL POWER | 37 | | KOBE-CITY | 52 | MAJOR LEAGUES | 48 |
| 3 | STOCK | 24 | THE REPUBLICAN PARTY | 29 | | DEATH | 45 | PITCHER | 43 |
| 4 | SUDDEN FALL | 19 | RICE | 64 | | AWAJI | 37 | ALL STAR | 32 |
| 5 | BUSINESS ACTIVITY | 21 | CHINA | 27 | | COLLAPSE | 34 | STRIKEOUT | 30 |
| 6 | BANK OF JAPAN | 20 | ELECTION | 31 | | HANSHIN | 38 | STARTER | 29 |
| 7 | DEALING | 19 | GOVERNMENT | 41 | | ACTIVITY | 38 | PLAYER | 27 |
| 8 | WEAK DOLLAR | 16 | CRINTON | 22 | | BURYING ALIVE | 27 | LEAGUE | 25 |
| 9 | WEAK YEN | 16 | CIVILIANS | 22 | | OCCURRENCE | 33 | HERO | 21 |
| 10 | INTERVENTION | 16 | FRANCE | 15 | | VOLUNTEER | 29 | GAME | 20 |
| 11 | STOCK | 15 | RUSSIA | 15 | | HYOGO PREF. | 28 | DREAM | 16 |
| 12 | DEFICIT | 15 | OPERATION | 14 | | DEFENDANT | 25 | BASEBALL | 15 |
| 13 | FINAL VALUE | 13 | GROUP | 14 | | NISHINOMIYA-CITY | 22 | ENTREE | 15 |
| 14 | REMITTANCE | 13 | HOUSE OF REPRESENTATIVES | 14 | | TOKYO | 38 | STRIKE OUT | 15 |
| 15 | INVESTMENT | 15 | JAPAN | 44 | | SEISMIC INTENSITY | 21 | FAN | 13 |
| 16 | FALL | 12 | WASHINGTON | 18 | | DEAD | 22 | RICE | 35 |
| 17 | DOW | 12 | CANDIDATE | 19 | | DRIVING | 20 | THE ENTIRE UNITED STATES | 13 |
| 18 | RECOVERY | 16 | PRESIDENT (OF TAIWAN) | 12 | | PREFECTURAL POLICE | 20 | MOUND | 10 |
| 19 | AREA | 18 | CHAIRMAN | 15 | | BUILDING | 20 | LOST POINT | 10 |
| 20 | EXPORT | 13 | SOUTHEAST ASIA | 11 | | BELIEVER | 21 | TEXAS | 10 |
| 21 | BUYING AND SELLING | 12 | VIETNAM | 11 | | KOBE | 19 | JAPANESE | 10 |
| 22 | MARKET PRICE | 11 | MILITARY AFFAIRS | 12 | | TOKYO METROPOLITAN POLICE DEPARTMENT | 18 | HIT | 8 |
| 23 | NEW YORK | 16 | USA | 13 | | DAMAGE | 19 | GOING TO THE MOUND | 8 |
| 24 | ORDER | 12 | NUCLEAR TEST | 11 | | SUFFERING DISASTER | 20 | ALL-STAR GAME | 8 |
| 25 | UPDATE | 11 | ATOMIC BOMB | 14 | | EVENT | 22 | PITCH | 8 |
| 26 | PREVIOUS WEEK | 10 | CONTRAVENTION | 15 | | POWER FAILURE | 16 | HARD PITCHING | 7 |
| 27 | SKYROCKET | 10 | KOREA | 11 | | DOCTRINE | 18 | HOME RUN | 7 |
| 28 | BANK | 11 | LEADER | 10 | | KINKI | 19 | SUPERSTAR | 7 |
| 29 | ECONOMY | 17 | EC | 10 | | SUSPICION | 10 | JOHNSON | 7 |
| 30 | STOCK MARKET | 10 | MINISTER FOR DEFENSE | 9 | | HIBIYA | 10 | APPLAUSE | 6 |

FIG.14

| | NUMBER OF ELEMENTS | ECONOMIC | FOREIGN | INDUSTRY | POLITICS | SCIENCE | SOCIETY | SPORTS |
|---|---|---|---|---|---|---|---|---|
| A → | LABELS: YAMADA, PITCHER, MAJOR LEAGUE<br>26 | | | | | | | 26 |
| B → | LABELS: EARTHQUAKE, PERSON, AWAJISHIMA, KOBE-CITY, COLLAPSE, HYOGO, BURYING ALIVE, OCCURREN<br>33 | | | 1 | | | 4 | 27 |
| | LABELS: AWAJISHIMA, COLLAPSE, BURYING ALIVE, OCCURRENCE, PREFECTURAL POLICE, POWER FAILURE, KINKI AREA, DEAD<br>6 | | | | | | 6 | |
| | LABELS: RUNNING, EXPERIMENT, LABORATORY, INSTITUTION, TRANSPORTATION, SPEED PER HOUR, ACCIDENT<br>3 | | | | | | 3 | |
| C → | LABELS: PRIME MINISTER (PRIME MINISTER XXX), VIOLATION OF THE CONSTITUTION, DISCUSSION, COALITION GOVERNMENT PARTY<br>27 | | | 1 | 26 | | | |
| D → | LABELS: DOLLAR, YEN, SEN, STRONG YEN, % - SUDDEN FALL<br>56 | 25 | 7 | 20 | 2 | | 1 | 1 |
| | LABELS: SEN, DOLLAR, STRONG YEN, MARKET, TIME, PREVIOUS DAY, WEAK YEN, SUDDEN FALL<br>10 | 9 | | | | | | |
| | LABELS: STATION, TOKYO, WEAK YEN, MINISTRY OF POSTS AND TELECOMMUNICATIONS, OPTICAL FIBER NETWORK, PHS, MAINTENANCE<br>9 | 4 | | 3 | | 1 | 1 | |
| E → | LABELS: MR., NEW PARTY, XX PARTY, (MR. XX), (MR. XX), (FORMATION OF A NEW PARTY)<br>28 | 2 | | | 25 | | 1 | |
| F → | LABELS: XXXX, -, INVESTIGATION HEADQUARTERS, EQUIPMENT, DEFENDANT, RESEARCH<br>72 | 10 | | 13 | 14 | 16 | 19 | |
| | LABELS: XXXXX, INVESTIGATION HEADQUARTERS, BELIEVER, EQUIPMENTS, DRUGS, (10-XXXX), (THE SEVENTH-XXXX), INVESTIGATION<br>4 | | | | | | 4 | |
| | LABELS: RAT, EXPERIMENT, TRAINING, PERSON, BRAIN, LABORATORY, ATOMIC BOMB, AIRDROP<br>21 | 8 | | 2 | | 6 | 4 | |
| G → | LABELS: PRESIDENT, THE COMMUNIST PARTY, POLITICAL POWER, ELECTION, WASHINGTON, CANDIDATE, INTERNET, STATE<br>35 | 1 | 23 | 7 | 2 | 1 | | 1 |
| | LABELS: PRESIDENT, THE REPUBLICAN PARTY, CANDIDATE, CHAIRMAN, HOUSE OF REPRESENTATIVES (PRESIDENT CRINTON), DEMOCRATIC PARTY, WINNING<br>12 | | 10 | 1 | | | | 1 |
| | LABELS: TOWARD JAPAN, CONFERENCE, EXPORT, EC, WEAPON, SOUTH AFRICA, JAPAN, SOUTHEAST ASIA<br>12 | 1 | 8 | 2 | | | 1 | |

METHOD AND APPARATUS FOR CATEGORIZING INFORMATION, AND A COMPUTER PRODUCT

FIELD OF THE INVENTION

The present invention in general relates to a technology used for categorizing a large amount of text information or the like. More particularly, this invention relates to a technology which can improve categorizing accuracy and efficiency by selecting a categorizing method having the highest categorizing accuracy from among a plurality of categorizing methods.

BACKGROUND OF THE INVENTION

Recently, a huge amount of text information is easily available by using the Internet. Hence, a technique which can grasp the contents of these huge amount text information and efficiently extract necessary text information from these information is desired. This is because if these text information are categorized into determined categories, it is convenient for search at the time of utilizing the text information in a later stage, or when finding related text information.

Conventionally, these huge amount of text information have been categorized manually into optimum categories in a categorizing system consisting of a plurality of categories, by a person in charge of categorizing, an originator of the text information or a person using the text information, who judges the contents of new text information. Moreover, as another categorizing method, there is a method in which the content of new text information is analyzed, utilizing a computer system, and the text information corresponding to the category is automatically categorized based on the analysis result. With the former categorizing method, the cost is extremely high, and with the latter categorizing method, there are problems in the number of categories and categorizing accuracy for obtaining practical results. Accordingly, means and methods for effectively solving these problems have been desired earnestly.

At present, a large amount of computerized text information have been circulated, and categorizing based on the implication of the text information becomes important problem from a standpoint of efficient search/usage of the text information. As means for solving such a problem, an information categorizing apparatus that automatically executes the categorizing operation of the text information has been used in every field.

Moreover, as a method for deriving a categorizing method of text information based on categorizing examples of given text information, and thereafter, categorizing new text information based on the categorizing method, there have been so far disclosed various categorizing methods in, for example, Japanese Patent Application Laid-Open Nos. 11-328211, 1-296552, 11-167581, 11-161671 and the like. Conventional categorizing methods will now be listed below:

(1) a statistical categorizing method based on a stochastic model;
(2) a categorizing method for performing automatic categorizing by means of learning; and
(3) a categorizing method for performing automatic categorizing by preparing a rule for categorizing text information into each category, and using this rule.

The categorizing method of (1) can find a general categorizing tendency, but cannot find a fine categorizing tendency. The categorizing method of (2) can obtain high categorizing accuracy, when the number of categories is less than several tens, but if the number increases to several tens or more, the categorizing accuracy decreases. Furthermore, the categorizing method of (3) requires huge cost for preparation of the rule and maintenance. As described above, the categorizing methods of (1) to (3) have both merits and demerits.

FIG. 18 is a block diagram showing a construction of a conventional information categorizing apparatus. In this figure, categorizing sample data 2 is category-related correct data comprising a plurality of texts, in which it is predetermined which text is to be categorized in which category. A feature element extraction section 1 extracts from each text a feature element (word) respectively representing the feature of each category from the categorizing sample data 2.

Here, at the time of extraction of the feature element, it is necessary to efficiently extract the feature element which can increase discrimination ability of each category. Therefore, in the feature element extraction section 1, a feature element extraction method for increasing the discrimination ability is used, based on the frequency of appearance of the feature element. As this feature element extraction method, a plurality of methods has been heretofore proposed. Moreover, as for the attribute of the feature element, there is adopted a method in which several parts of speech are specified, or the like.

The categorizing learning information generation section 3 calculates the feature of each category, respectively, from the feature element extracted by the feature element extraction section 1, and generates categorizing learning information 4 as the categorizing result. As the categorizing learning method in this categorizing learning information generation section 3, a plurality of methods have been heretofore proposed. The categorizing learning information 4 is the information representing the correspondence between the situation of the feature element and the category. An automatic categorizing section 5 categorizes a new text group 6 consisting of a plurality of texts to be categorized to categories, by means of one categorizing method fixedly set up in advance, based on the categorizing learning information 4, and outputs the categorizing result data 7.

In the conventional information categorizing apparatus (see FIG. 18), it has been described that there are a plurality of methods as the feature element extraction method in the feature element extraction section 1. However, since the categorizing accuracy in the categorizing result data 7 changes depending on the content and quantity of the new text group 6 to be categorized, it is difficult to uniquely specify the versatile extraction method that maintains high categorizing accuracy with respect to the new text group 6 of various contents and quantities.

Also in the categorizing learning information generation section 3, it has been similarly described that there are a plurality of categorizing learning methods. However, since the categorizing accuracy in the categorizing result data 7 changes depending on the content and quantity of the new text group 6 to be categorized, it is difficult to uniquely specify the versatile categorizing learning method that maintains high categorizing accuracy. Accordingly, with conventional information categorizing apparatus, one of the plurality of categorizing methods (feature element extraction method, categorizing learning method) is fixedly used inevitably.

Therefore, with the conventional information categorizing apparatus, categorizing of the new text group 6 is performed by one fixed categorizing method, causing a problem in that the categorizing accuracy varies depending on the content and quantity of the new text group 6, and hence, resulting in low categorizing accuracy.

SUMMARY OF THE INVENTION

It is an object of the present invention to provide a method and apparatus for categorizing information, which can increase the categorizing accuracy, regardless of the content and quantity of the information to be categorized.

In the method a apparatus for categorizing information according to the present invention, a plurality of categorizing methods are kept in a usable condition, and after a categorizing method having the highest categorizing accuracy is determined by the categorizing method determination unit from among the plurality of categorizing methods, based on the categorizing sample information, a new text group is categorized for each category according to this categorizing method. As a result, the categorizing accuracy can be increased compared to the conventional apparatus, regardless of the content and quantity of the information to be categorized.

The computer readable recording medium according to the present invention records a computer program which when executed on a computer realizes each and every step of the method according to the present invention. As a result, the method according to the present invention can be realized very easily and automatically.

Other objects and features of this invention will become apparent from the following description with reference to the accompanying drawings.

BRIEF DESCRIPTION OF THE DRAWINGS

FIG. 2 is a diagram showing one example of a new text group 80 shown in FIG. 1.

FIG. 3 is a diagram showing one example of categorizing result data 100 shown in FIG. 1.

FIG. 4 is a diagram showing the clustering result C in a clustering section 110 shown in FIG. 1.

FIG. 11 is a diagram showing a feature elements list $R_1$ in an order of frequency of appearance in one embodiment.

FIG. 12 is a diagram showing a feature elements ranking list $R_2$ in one embodiment.

FIG. 13 is a diagram showing a feature elements ranking list $R_3$ in one embodiment.

FIG. 14 is a diagram showing the clustering result distribution data CB in one embodiment.

DESCRIPTION OF THE PREFERRED EMBODIMENTS

A preferred embodiment of the information categorizing apparatus, information categorizing method, and computer readable recording medium that records an information categorizing program according to the present invention will now be described in detail with reference to drawings.

Figure 1:
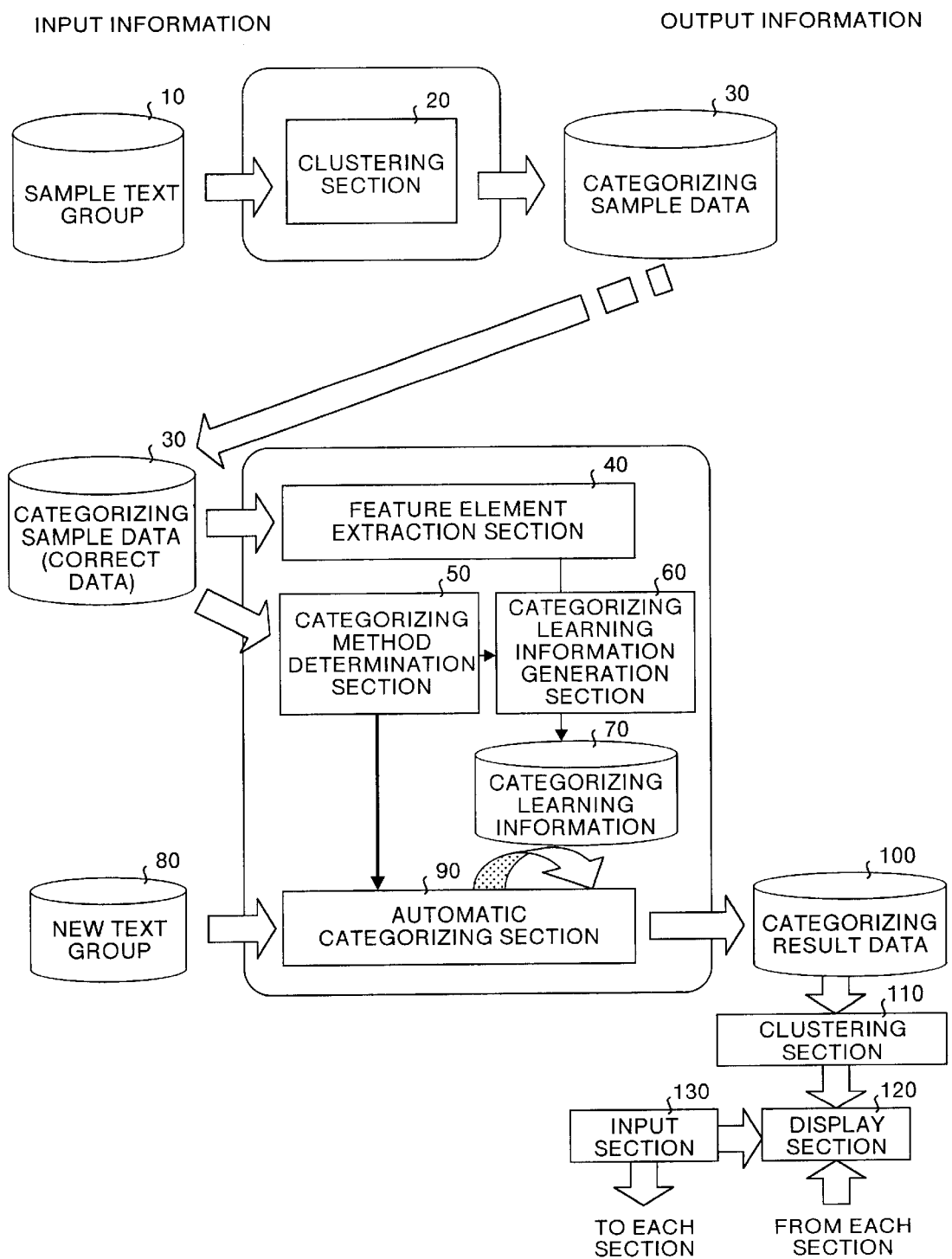
FIG. 1 is a block diagram showing the construction of one embodiment according to the present invention.

FIG. 1 is a block diagram showing a construction of one embodiment of the present invention. In this figure, the sample text group 10 is a set of a plurality of uncategorized texts. A clustering section 20 clusters a sample text group 10, to thereby generate the categorizing sample data 30. This categorizing sample data 30 is categorizing-related correct data comprising a plurality of texts, in which it is predetermined which text is to be categorized in which category.

Figure 18:
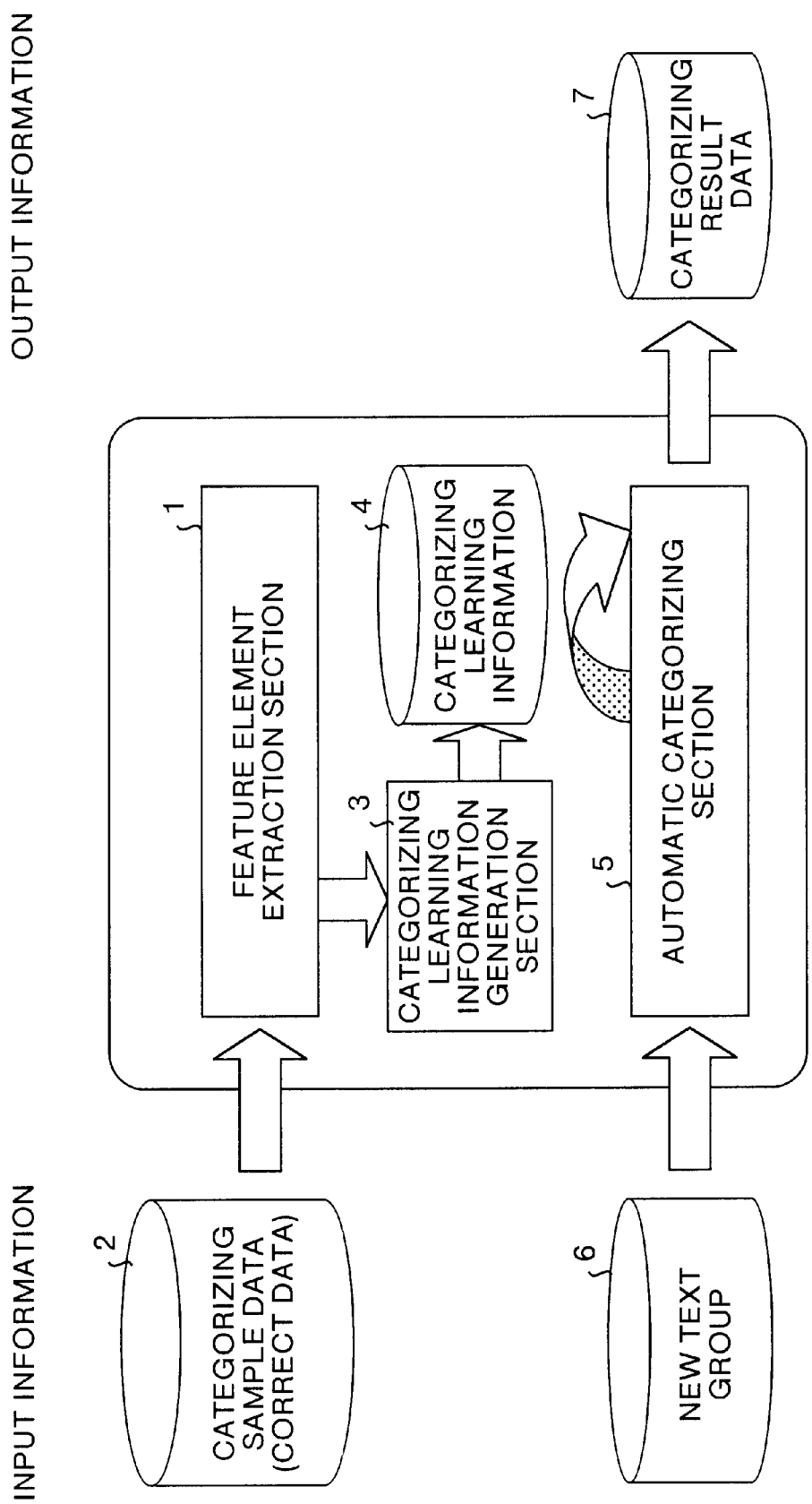
FIG. 18 is a block diagram showing a construction of a conventional information categorizing apparatus.

A feature element extraction section 40 extracts from each text a feature element (word) respectively representing the feature of each category from the categorizing sample data 30, in the same manner as with the feature element extraction section 1 (see FIG. 18). However, it is different from the feature element extraction section 1 in that while the feature element extraction section 1 extracts a feature element according to one feature element extraction method, the feature element extraction section 40 extracts a feature element according to a plurality of feature element extraction methods, respectively.

The categorizing learning information generation section 60 calculates the feature of each category, respectively, from the feature element extracted by the feature element extraction section 40, and generates categorizing learning information 70 as the categorizing result in the same manner with the categorizing learning information generation section 3 (See FIG. 18). However, it is different from the categorizing learning information generation section 3 in that while the categorizing learning information generation section 3 calculates a feature in accordance with one categorizing learning method, the categorizing learning information generation section 60 calculates a feature in accordance with a plurality of categorizing learning methods, respectively.

The categorizing method determination section 50 determines a categorizing method having the highest categorizing accuracy from among a plurality of categorizing methods, for example, by a known cross validation. The detailed description for the operation of this categorizing method determination section 50 will be given below. A new text group 80 consists of, as shown in FIG. 2, a plurality of new text $TX_1$ (text name text1) to new text $TX_{10}$ (text name text10) . . . to be categorized. Returning to FIG. 1, an automatic categorizing section 90 classifies the new text group 80 into categories based on the categorizing method determined by the categorizing method determination section 50 and the categorizing learning information 70, and outputs this as the categorizing result data 100 (see FIG. 3).

Figure 5:
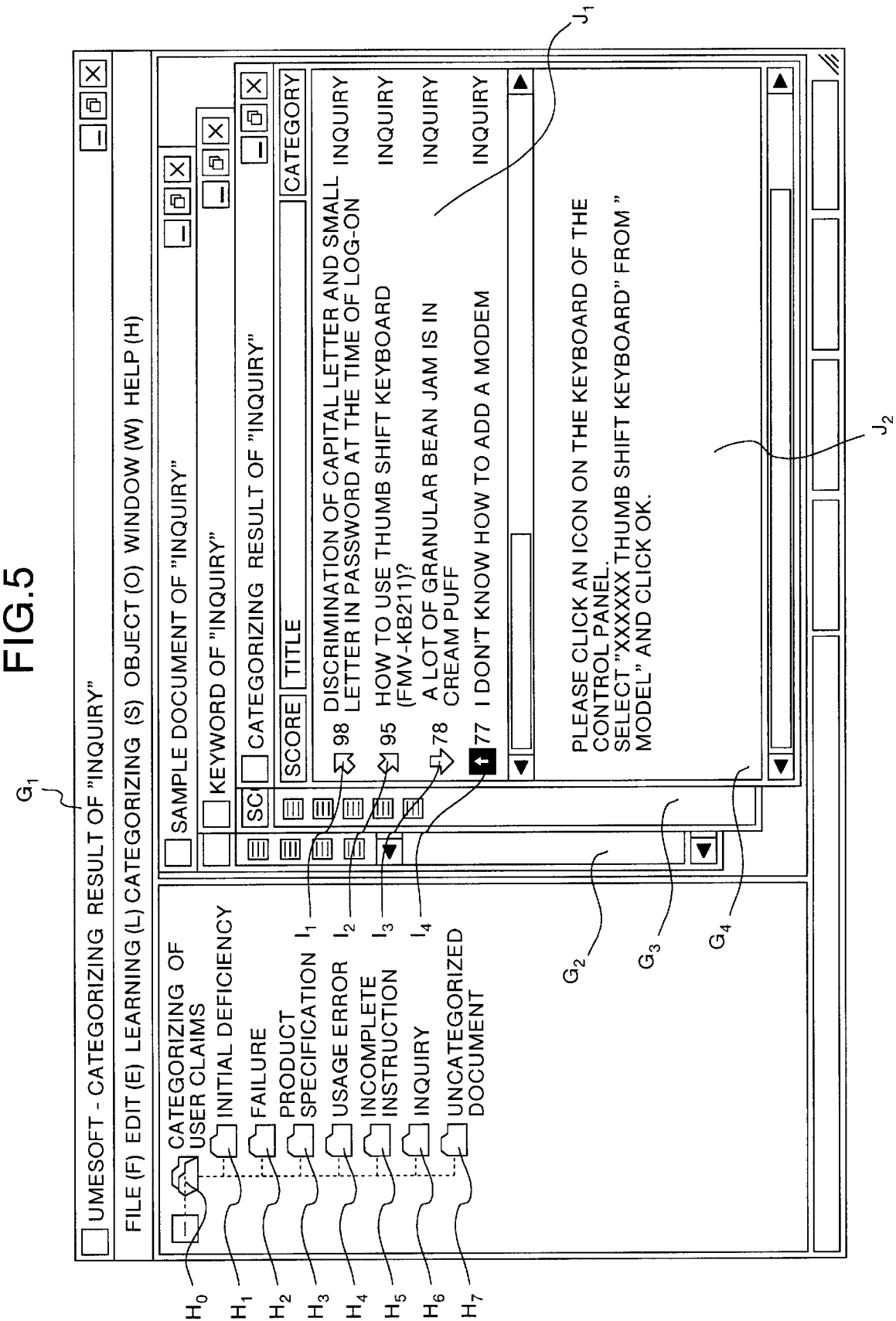
FIG. 5 is a diagram showing a display example of a display section 120 shown in FIG. 1.
Figure 6:
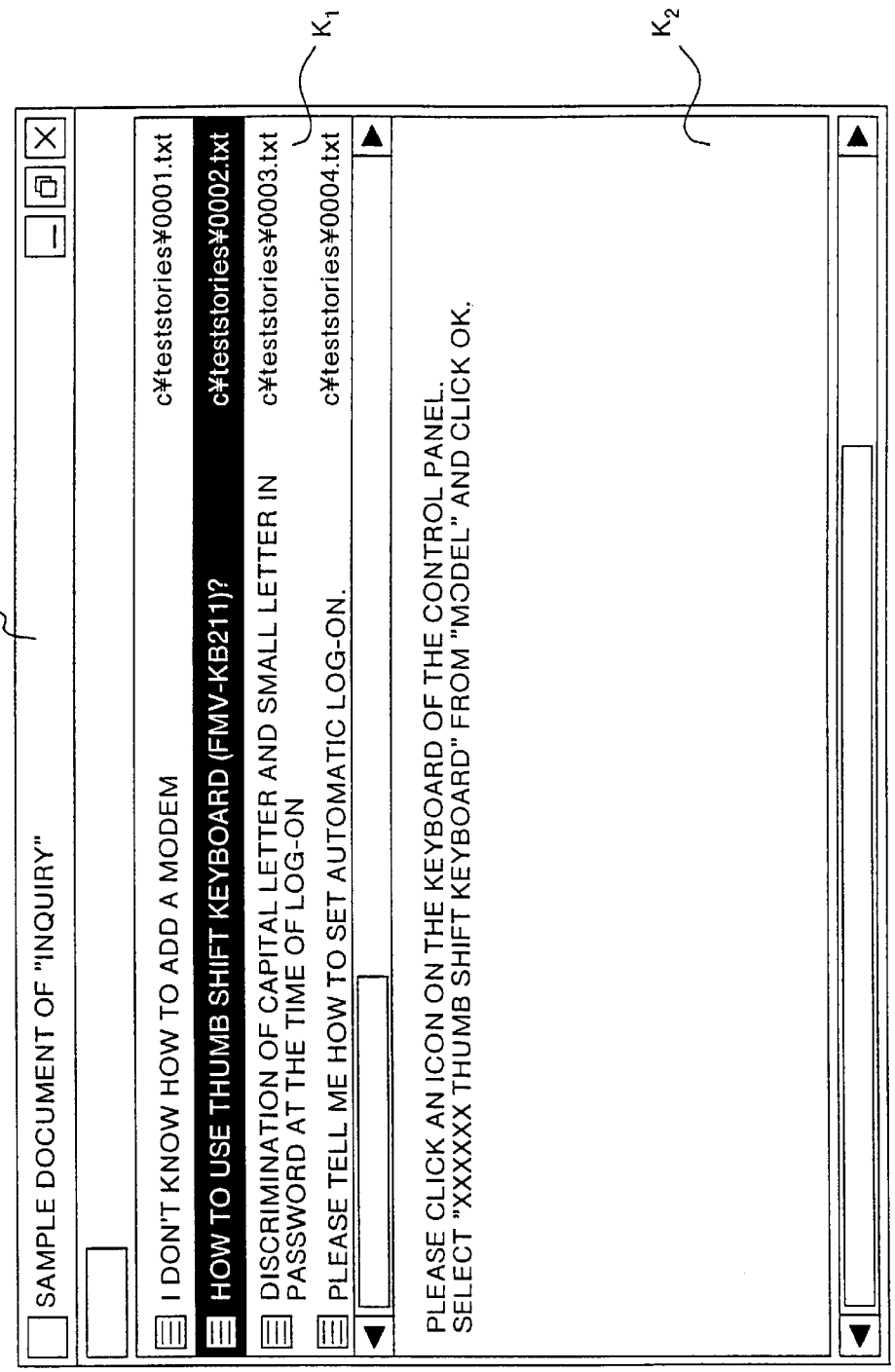
FIG. 6 is a diagram showing a display example of a display section 120 shown in FIG. 1.
Figure 7:
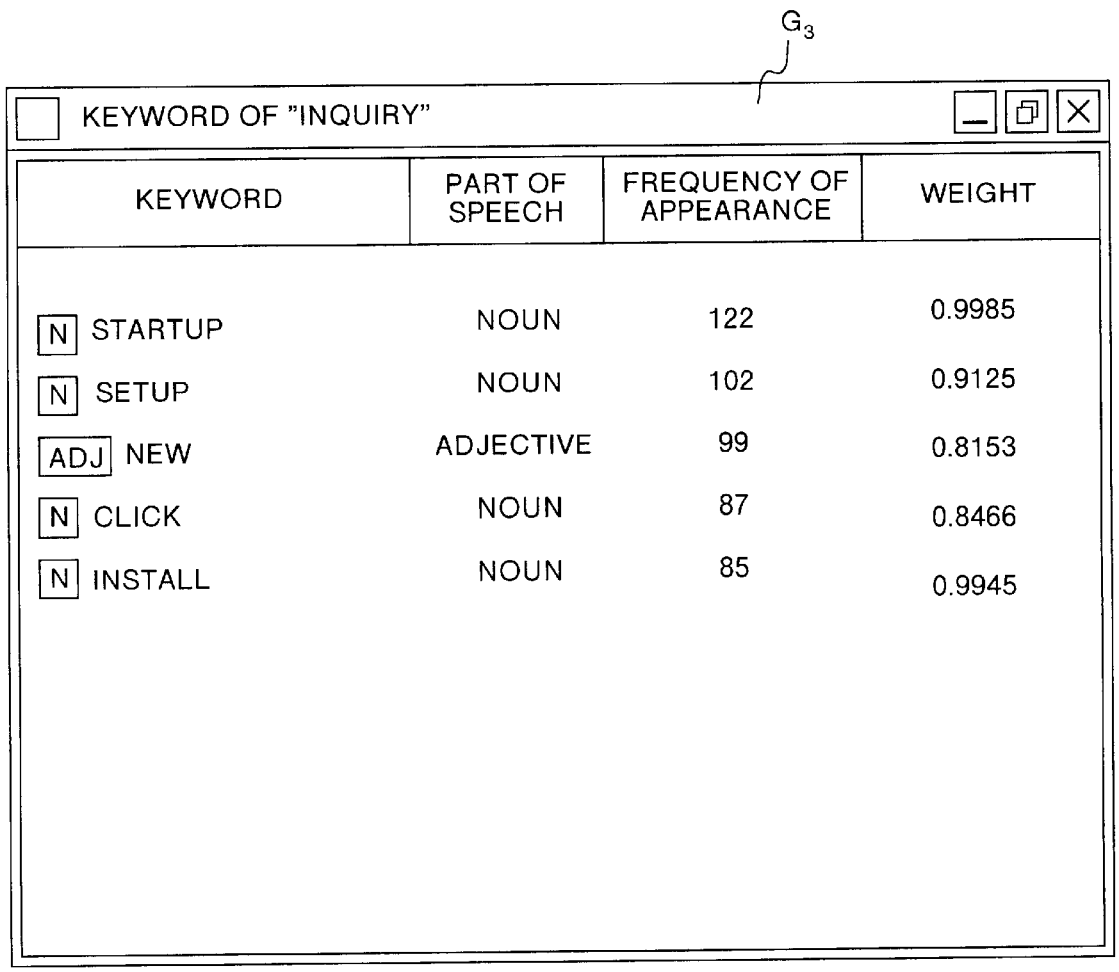
FIG. 7 is a diagram showing a display example of a display section 120 shown in FIG. 1.

A clustering section 110 clusters the categorizing result data 100 and obtains a clustering result C (see FIG. 4). A display section 120 is a display for displaying the clustering result C from the clustering section 110 and various data from each section. In FIG. 5 to FIG. 7, there are shown display examples of the display section 120. An input section 130 is a mouse, a keyboard or the like for performing edit operation described later, the window operation in the display section 120 or the like.

Figure 8:
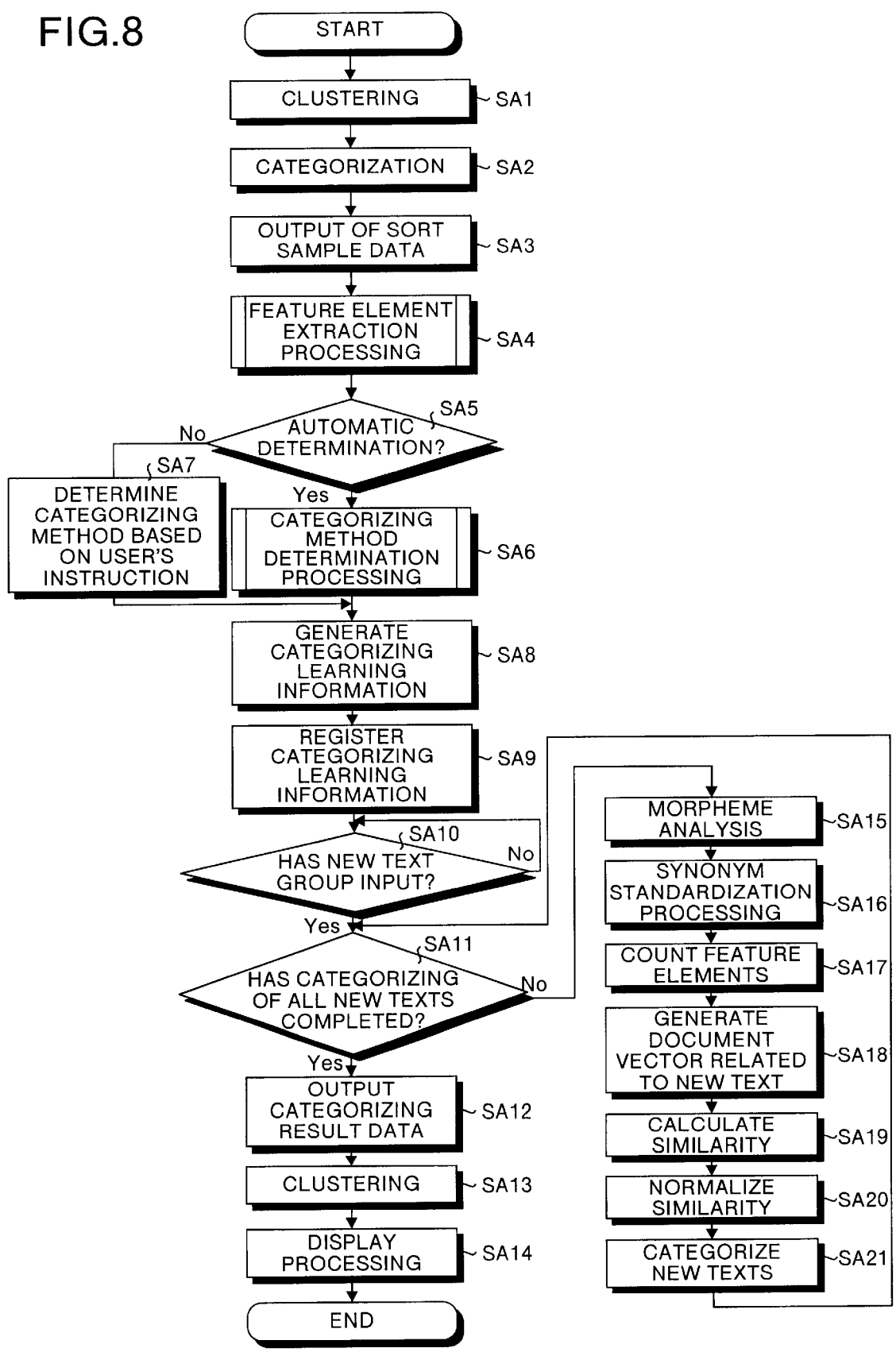
FIG. 8 is a flowchart for explaining the operation in one embodiment.
Figure 9:
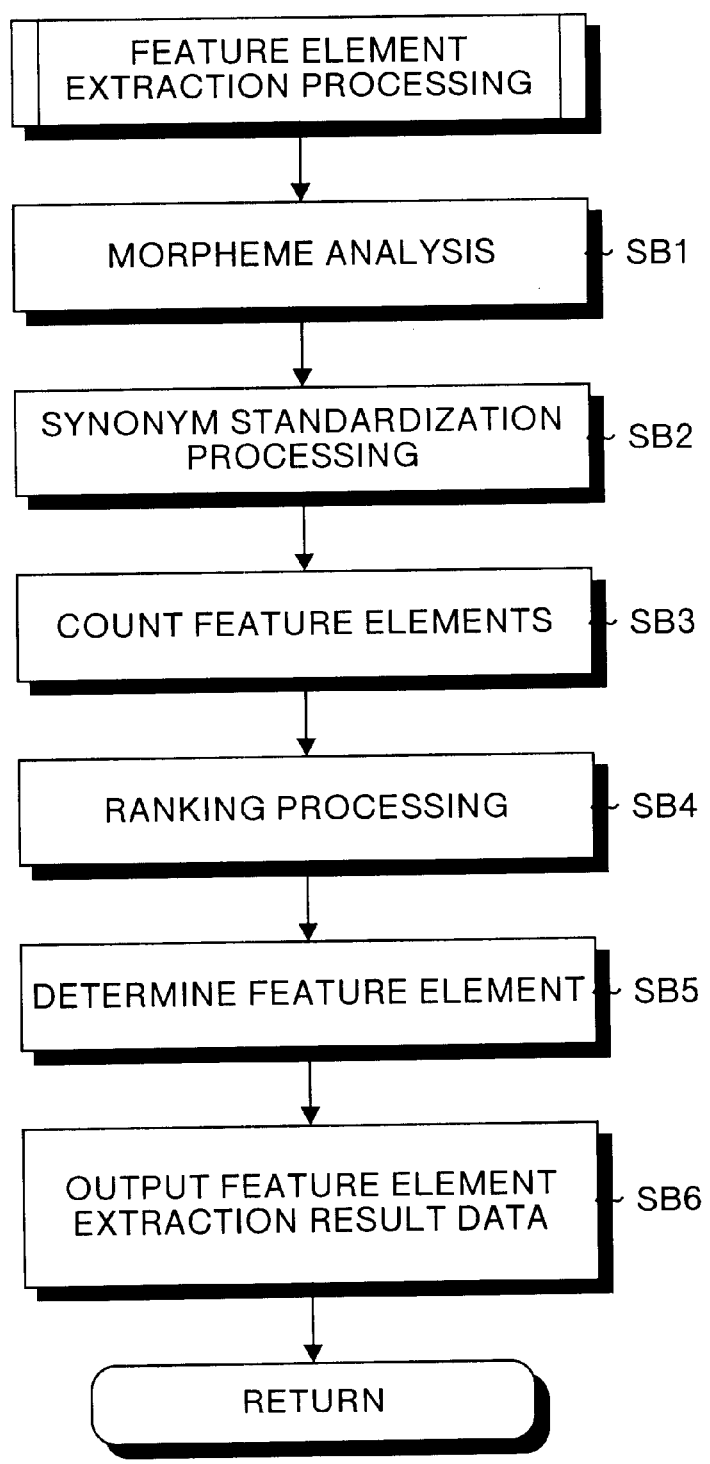
FIG. 9 is a flowchart for explaining the feature element extraction processing shown in FIG. 8.
Figure 10:
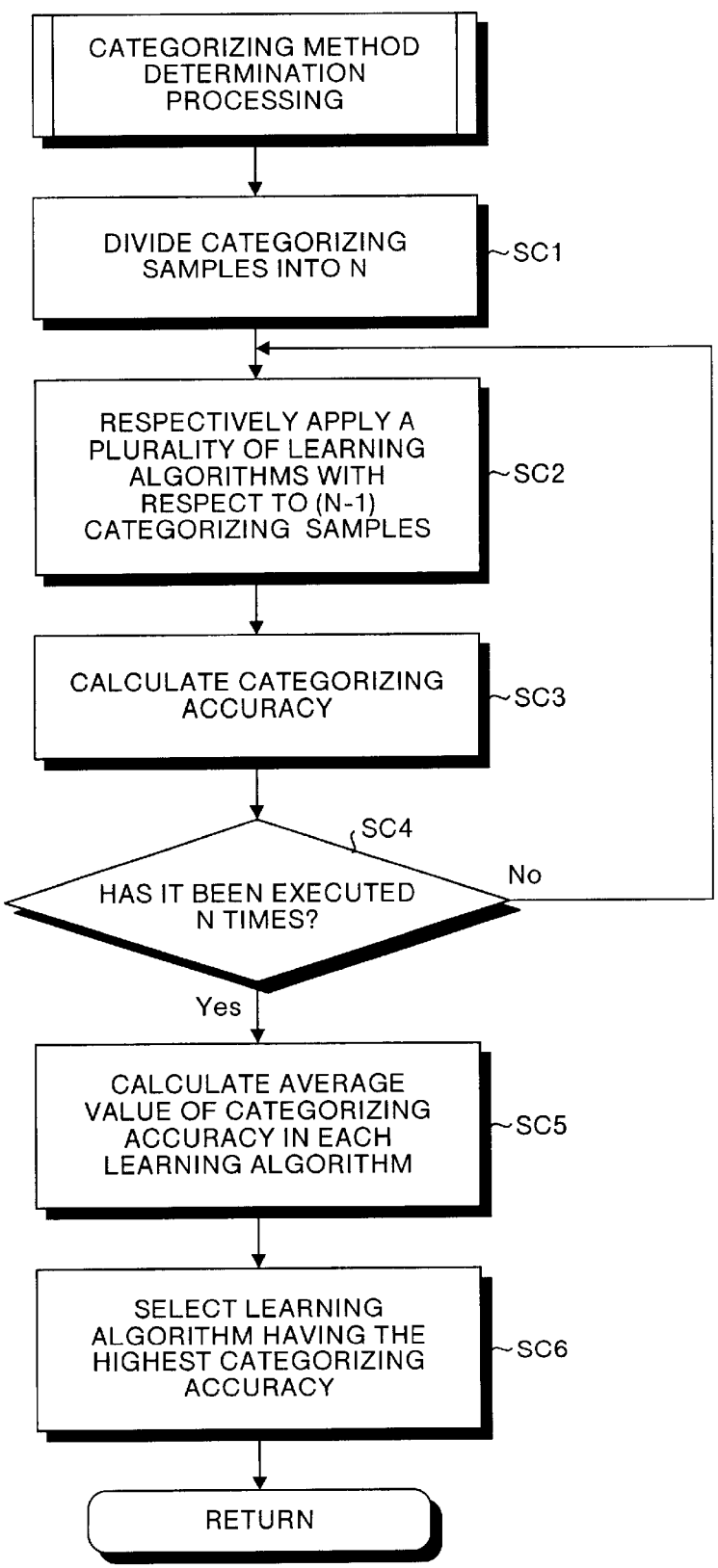
FIG. 10 is a flowchart for explaining the categorizing method determination processing shown in FIG. 8.

The operation will now be described, with reference to flow charts shown in FIG. 8 to FIG. 10. When the sample text group 10 is input to the clustering section 20 shown in FIG. 1, instep SA1 shown in FIG. 8, the clustering section 20 clusters a plurality of texts in the sample text group 10. In step SA2, the clustering section 20 categorizes each cluster. In step SA3, the clustering section 20 outputs the categorizing sample data 30 (correct data) related to categorizing, consisting of a plurality of texts, in which it is predetermined which text is to be categorized in which category, to the feature element extraction section 40.

Thereby, in step SA4, the feature element extraction section 40 executes the feature element extraction processing for extracting from each text a feature element (word) respectively representing the feature of each category in the categorizing sample data 30. That is to say, in step SB1 shown in FIG. 9, the feature element extraction section 40 extracts candidates of a feature element (word) representing the feature of the category, by morpheme analysis of the categorizing sample data 30. In step SB2, the feature element extraction section 40 executes processing for standardizing a synonym in the candidates of the extracted feature element.

In step SB3, the feature element extraction section 40 counts the feature elements of the same word for each category, with regard to the plurality of candidates of extracted feature element. In step SB4, the feature element extraction section 40 executes ranking processing for narrowing the plurality of candidates of feature element for each category. With this ranking processing, a method for ranking the feature element in an order of high frequency of appearance for each category, a method for ranking the feature element in an order of high probability of appearance for each category, or a method for ranking the feature element for each category, by adopting a statistical method (a method of decreasing the ranking of the feature element which appears also in other category) for calculation of frequency of appearance is adopted, with respect to the plurality of candidates of feature element.

In step SB5, the feature element extraction section 40 extracts a predetermined number of feature elements of high ranking described above in an order of high rank for each category, and extracts these as the feature element. In step SB6, the feature element extraction section 40 outputs the extracted feature elements as the feature element extraction result data. FIG. 11 shows a list $R_1$ of feature elements in an order of frequency of appearance, which is ranked in the order of frequency of appearance (corresponding to the feature element extraction result data), among the above-described three ranking methods.

In this figure, there are a field of categories ("Economic", "Foreign", . . . "Society" and "Sports"), and a field of frequency representing the frequency of appearance of feature elements ("Market", "Strong yen", etc.) in the category. In the records corresponding to the respective categories, the number of texts categorized in the category is described. The text herein refers to one which constitutes the sample text group 10 (see FIG. 1). For example, in the category of "Economic", 27 texts are categorized, and in the category of "Foreign", 43 texts are categorized.

The leftmost field in this figure shows a ranking in the frequency of appearance in the order of high ranking. For example, in the category of "Economic", the feature element of the first ranking in the frequency of appearance in 27 texts is "Market" (frequency: 61.0), the feature element of the second ranking is "Strong yen" (frequency: 40.0), and so forth. The feature element of the 30th ranking is "Finance" (frequency: 12.0).

FIG. 12 shows a feature elements list $R_2$ in an order of frequency of appearance (corresponding to the feature element extraction result data), in which the feature elements are ranked for each category, by adopting a statistical method referred to as "Kullback-Leibler method", among the above-described three ranking methods. The basic construction of the feature elements ranking list $R_2$ shown in this figure is the same as the construction of the feature elements list $R_1$ in the order of frequency of appearance (see FIG. 11).

However, in the feature elements ranking list $R_2$, a statistical method is adopted in which the ranking of feature elements which also appear in other categories are dropped, to thereby improve the discrimination ability between this category and other categories. For example, "Dollar" (feature element) in the third ranking in the category of "Economic" shown in FIG. 11 is dropped to lower than 31st (not shown) in the category of "Economic" shown in FIG. 12.

Returning to FIG. 8, in step SA5, the categorizing method determination section 50 judges whether the categorizing method applied to the new text group 80 is to be automatically decided or not. If there is no instruction from a user, the categorizing method determination section 50 designates the judgment result in step SA5 as "Yes". On the other hand, if the user instructs the categorizing method by manual operation, the categorizing method determination section 50 designates the judgment result in step SA5 as "No", and decides the categorizing method in step SA7 based on the instruction from the user.

In this case, in step SA6, the categorizing method determination section 50 executes the categorizing method determination processing for determining the categorizing method automatically, such as cross-validation. That is to say, in step SC1 shown in FIG. 10, the categorizing method determination section 50 divides at random the categorizing samples (texts) into N for each category in the categorizing sample data 30. In step SC2, the categorizing method determination section 50 respectively applies a plurality of learning algorithms (categorizing methods) with respect to (N-1) categorizing samples, to thereby prepare feature elements and categorizing learning information corresponding to respective learning algorithm.

In step SC3, the categorizing method determination section 50 applies the learning algorithm method with respect to the remaining (1/N) categorizing sample, using the feature element and categorizing learning information prepared in step SC2, and performs the categorizing test to thereby calculate the categorizing accuracy. This categorizing accuracy is calculated independently with respect to each of the plurality of learning algorithms. In step SC4, the categorizing method determination section 50 judges whether the above categorizing test has been conducted N times or not, and in this case, the judgment result is "No". Thereafter, in step SC2 and SC3, the categorizing accuracy related to the N categorizing samples is calculated for each of the plurality of learning algorithms, by changing the categorizing sample one by one.

Then, if the judgment result in step SC4 becomes "Yes", in step SC5, the categorizing method determination section 50 calculates an average value of the categorizing accuracy related to N categorizing samples for each of the plurality of learning algorithms. In step SC6, the categorizing method determination section 50 selects the highest average value among the plurality of average values of categorizing accuracy respectively corresponding to the plurality of learning algorithms (categorizing methods), and then selects the learning algorithm (categorizing method) corresponding to the selected categorizing accuracy. Moreover, the categorizing method determination section 50 informs a categorizing learning information generation section 60 and an automatic categorizing section 90 of the learning algorithm having the highest categorizing accuracy (categorizing method).

Returning to FIG. 8, in step SA8, the categorizing learning information generation section 60 generates categorizing learning information 70, based on the learning algorithm (categorizing method) informed by the categorizing method determination section 50, and the feature element extraction result data from the feature element extraction section 40. In step SA9, the categorizing learning information generation section 60 registers the categorizing learning information 70 in the database (not shown). In step SA10, an automatic categorizing section 90 judges whether a new text group 80 to be categorized has been input or not, and in this case, the judgment result is "No", and the same judgment is repeated.

Then, when the new text group 80 is input to the automatic categorizing section 90, the automatic categorizing section 90 changes the judgment result in step SA10 to "Yes". In step SA11, the automatic categorizing section 90 judges whether all of the automatic categorizing with respect to new text $TX_1$, new text $TX_2$, ... new text $TX_{10}$, ... which constitute the new text group 80 (see FIG. 2) has been completed or not, and in this case, the judgment result is "No". Thereafter, in step SA15 to step SA21, the automatic categorizing section 90 executes the automatic categorizing processing based on the categorizing method determined by the categorizing method determination section 50.

As an example of categorizing methods, a case where a new text group 80 is categorized based on the vector space method will be described below. In this case, it is assumed that the categorizing learning information 70 contains 30 feature elements for each category, and contains vectors of all feature elements and vectors for respective categories. In this state, in step SA15, the automatic categorizing section 90 executes morpheme analysis with respect to the new text $TX_1$ (see FIG. 2) in the new text group 80, to thereby extract a feature element (word). In step SA16, the automatic categorizing section 90 executes synonym standardization processing of standardizing the synonym in the extracted feature element.

In step SA17, the automatic categorizing section 90 counts the extracted feature elements. In step SA18, the automatic categorizing section 90 obtains the same feature element as that in the categorizing learning information 70 from a plurality of feature elements included in the new text $TX_1$. Then, the automatic categorizing section 90 generates a document vector related to the obtained feature element, that is, the new text $TX_1$.

In step SA19, the automatic categorizing section 90 calculates the similarity (cosine value) between the document vector related to the new text $TX_1$ and the vector in each category in the categorizing learning information 70. If it is assumed that the vector in the category is A, and the document vector in the new text $TX_1$ is B, this similarity (cosine value) is represented by the following formula:

Similarity (cosine value)+inner product of vector *A*+document vector *B*/(size of vector *A*×size of document vector *B*).

That is to say, in step SA19, the similarity (cosine value) is calculated with regard to the new text $TX_1$, by the number of categories. In step SA20, the automatic categorizing section 90 normalizes the calculated plurality of similarities (cosine values) (it is to be a value from 0 to 100). In step SA21, the automatic categorizing section 90 selects the similarity of the threshold (for example, 70) or higher among the plurality of similarity (cosine values), and then categorizes the new text $TX_1$ in category corresponding to the selected similarity. If all of the plurality of similarities do not reach the threshold, the automatic categorizing section 90 designates the new text $TX_1$ as an uncategorizable text. Thereafter, the processing from step SA15 to step SA21 is repeated, to thereby sequentially categorize the new text in categories.

Then, when the categorizing of all new texts has been completed, the automatic categorizing section 90 designates the judgment result in step SA11 as "Yes". In step SA12, the automatic categorizing section 90 outputs the categorizing result data 100 shown in FIG. 3. In this figure, the text name text1 to text name text20 ... correspond to the text name text1 to text name text10 ... shown in FIG. 2, wherein "AUTOMOTIVE_INDUSTRY" etc. show categories, and the figure on the right side of the category represent the score (for example, similarity). That is to say, the new text $TX_1$ shown in FIG. 2 is categorized in the category of "AUTOMOTIVE_INDUSTRY", and the score (similarity) is "85".

Returning to FIG. 8, in step SA13, the clustering section 110 clusters the new text group 80, using the categorizing result data 100. FIG. 4 is a diagram showing the clustering result C in the clustering section 110. In this figure, there is shown a case where the new text group 80 consisting of 1000 new texts is categorized, and the breakdown (the number of texts, feature elements) of 26 new texts when 26 new texts are categorized in the category of "Economic".

In step SA14, in the display section 120, for example, the clustering result C shown in FIG. 4 is displayed. Thereby, the user can confirm what contents are categorized in the category (in this case, "Economic").

In one embodiment, the feature elements ranking list $R_2$ shown in FIG. 12 may be displayed in the display section 120 to edit the feature elements ranking list $R_2$, according to user's request, and to perform categorizing by using the feature elements ranking list $R_3$ shown in FIG. 13. In this case, the user uses the input section 130 to edit, that is, to delete the feature element judged to be unnecessary in the feature elements ranking list $R_2$. Thereby, the feature elements ranking list $R_3$ is prepared (see FIG. 13), and the above-described processing is executed based on the feature elements ranking list $R_3$.

In one embodiment, when the structure of the categorizing sample data 30 and the new text group 80 is prescribed in advance, the area to be categorized in the categorizing sample data 30 and in the new text group 80 may be specified by the input section 130.

In the above description, an example where the result (categorizing sample data 30) clustered by the clustering section 20 shown in FIG. 1 is directly used in the feature element extraction section 40 has been described, but the clustering result may be verified. Hereinafter, this case is designated as a modified example 1 of one embodiment, and will be described with reference to FIG. 14 and FIG. 15.

Figure 15:
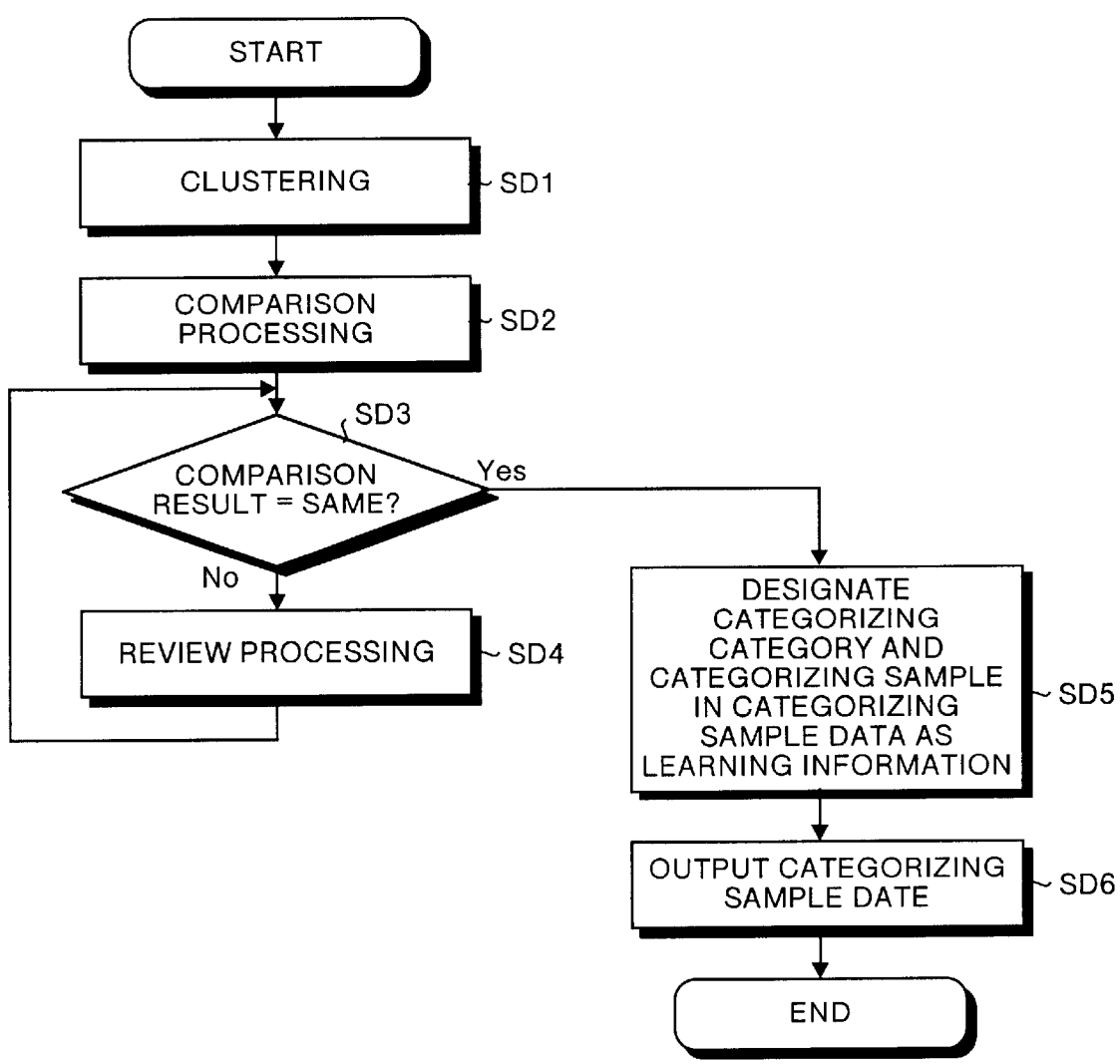
FIG. 15 is a flowchart for explaining a modified example 1 in one embodiment.

In step SD1 shown in FIG. 15, clustering is executed by the clustering section 20, with respect to the sample text group 10 included in the categorizing sample data 30 (correct data) shown in FIG. 1. In this case, allotment of categories in the categorizing sample data 30 is ignored. FIG. 14 is a diagram showing the result clustered by the clustering section 20 (clustering result distribution data CB). In this figure, a result of clustering 277 texts allotted in seven categories ("Economic", "Foreign", . . . "Sport") is shown.

According to this figure, it is seen that in "Sports" in A record and "Politics" in C and E records, allotment of categories is performed clearly. On the contrary, it is seen that discrimination of "Economic" and "Industry" in D record and discrimination of "Foreign", "Industry", "Politics", "Science" and "Society" in F record and after is ambiguous. In this case, processing in step SD4 described below is performed. In step SD2, the clustering result (allotment of categories) and allotment of categories that the user initially assumed are compared by a comparison section (not shown).

In step SD3, the comparison section judges whether the comparison result in step SD2 is the same or not, and if this judgment result is "No", the comparison result is displayed on the display section 120. Thereby, instep SD4, the user uses the input section 130 to review the clustering result (allotment of categories), to edit the categories. On the other hand, if the judgment result in step SD3 is "Yes", that is, allotment of categories in the categorizing sample data 30 is the same as what the user initially assumed, in step SD5, the categories and the categorizing samples (texts) are designated as learning information. In step SD6, the comparison section (not shown) outputs the categorizing sample data 30 to the feature element extraction section 40. As a result, the above-described processing is performed.

Figure 16:
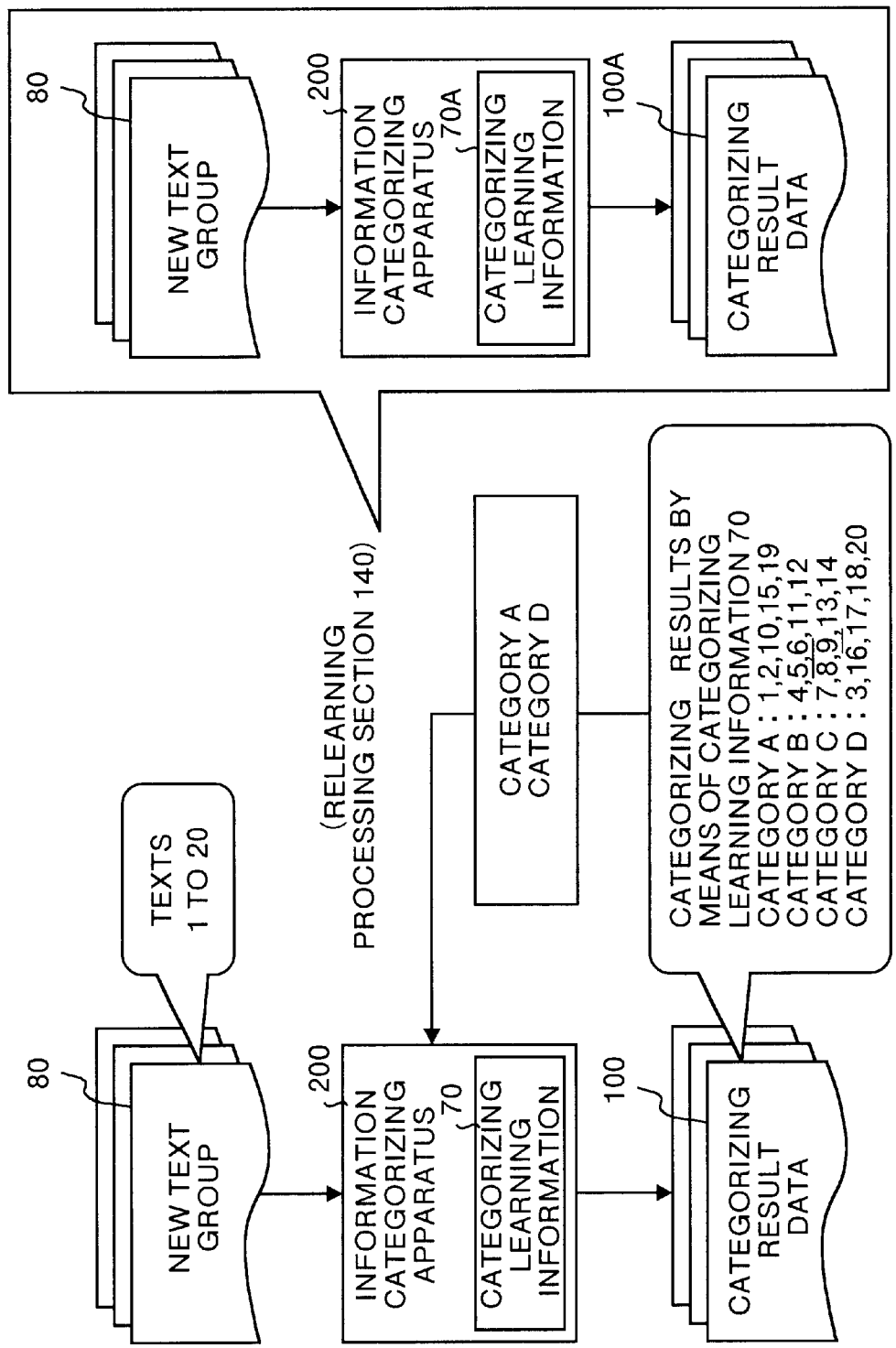
FIG. 16 is a diagram for explaining a modified example 2 in one embodiment.

In the above description, an example where the categorizing result data 100 categorized by the automatic categorizing section 90 is directly output has been described. However, after categorizing is performed by the automatic categorizing section 90, it may be verified whether the categorizing result data 100 is the desired one or not, and if this verification result is NG, this verification result is feed backed to the categorizing learning information 70 for relearning, to thereby improve the categorizing accuracy. This case will now be described as a modified example 2 of one embodiment with reference to FIG. 16. In this figure, parts corresponding to each part in FIG. 1 are denoted by the same reference symbols. In this figure, a relearning processing section 140 is newly provided. This relearning processing section 140 prepares categorizing learning information 70A upon reception of the above-described feedback.

When the new text group 80 consisting of 20 new texts is input to the information categorizing apparatus 200, the new text group 80 is automatically categorized, in the similar manner as described above, based on the categorizing learning information 70 and the predetermined categorizing method. Thereby, the categorizing result data 100 is output from the information categorizing apparatus 200. The categorizing result data 100 is displayed on the display section 120. Here, in the categorizing result data 100, if it is assumed that the new texts (5) and (6) allotted in the category B should be allotted in the category A, and the new text (9) allotted in the category C should be allotted in the category D, the user uses the input section 130 to edit it to the desired allotment.

Thereby, the relearning processing section 140 performs relearning processing with the similar operation as with the categorizing learning information generation section 60 (see FIG. 1), based on the edited categorizing result data 100, to thereby reconstruct the categorizing learning information 70A. In this state, if the new text group 80 is input to the information categorizing apparatus 200, the new text group 80 is automatically categorized based on the reconstructed categorizing learning information 70A and the predetermined categorizing method, in the similar manner as described above. In this case, the categorizing accuracy of the categorizing result data 100 output from the information categorizing apparatus 200 is extremely high, due to the relearning effect.

In one embodiment, the screen $G_1$ shown in FIG. 5 may be displayed on the display section 120 shown in FIG. 1, to thereby display various information generated in the categorizing processing. On the screen $G_1$, there are respectively displayed a folder $H_0$ corresponding to the category of "Categorizing of user claims", and folder $H_1$~$H_7$ corresponding to the categories of "Initially defective" . . . "Inquiry" and "Uncategorized document" belonging to the subordinate of this category.

Moreover, on the screen $G_1$, screens $G_2$~$G_4$ are displayed by the window control. On the screen $G_2$, there are displayed a title $K_1$ of the sample document (corresponding to the categorizing sample data 30) corresponding to the category of "Inquiry", as shown in FIG. 6, and the text content $K_2$. In addition, on the screen $G_3$, there is displayed a keyword (feature element) corresponding to the category of "Inquiry". On the screen $G_4$ shown in FIG. 5, there are displayed a list screen $J_1$ of the new text categorized in the category of "Inquiry", and the content display screen $J_2$ related to the content of the new text. Here, the icons $I_1$~$I_4$ in the list screen $J_1$ of the new text represent the score change after the relearning, with respect to the score (similarity) before the relearning in the above-described modified example 2.

That is to say, the icon $I_1$ means that the score (similarity) becomes higher than the previous score, and the icon $I_2$ means that the score (similarity) becomes lower than the previous score. The icon $I_3$ means that the new text categorized in the category (in this case, "Inquiry") previously is not categorized in this category this time. Moreover, the icon $I_4$ means that the new text uncategorized in the category (in this case, "Inquiry") previously is categorized in this category this time.

As described above, according to one embodiment of the present invention, a plurality of categorizing methods are kept in a usable condition, and after a categorizing method having the highest categorizing accuracy is determined by the categorizing method determination section 50 from among the plurality of categorizing methods, based on the categorizing sample data 30, the new text group 80 is categorized for each category according to this categorizing method. As a result, the categorizing accuracy can be increased compared to the conventional apparatus, regardless of the content and quantity of the information to be categorized.

Moreover, according to one embodiment of the present invention, a plurality of future elements categorizing methods are kept in a usable condition by the feature element extraction section 40, and feature elements corresponding to these plurality of feature element extraction methods are respectively extracted, and in particular, a feature element corresponding to the feature element extraction method having the highest discrimination ability between categories is designated as the extraction result. As a result, the categorizing accuracy of the categorizing result corresponding to this feature element can be further increased.

According to one embodiment of the present invention, the input section 130 and the display section 120 (editing unit) are provided for enabling edit (deletion, addition, or the like) of the extracted feature element, and hence flexible feature element setting can be performed with respect to the category.

According to one embodiment of the present invention, since the area to be categorized in the categorizing sample data 30 and the new text group 80 is assigned by the input section 130 and the display section (assignment unit), an area unnecessary for categorizing can be excluded, and essentially necessary area can be categorized. As a result, the categorizing accuracy can be further improved.

According to one embodiment of the present invention, since the categorizing sample data 30 is generated by the clustering section 20, the efficiency can be greatly improved, and work load onto the user can be reduced, compared to a case where the category is manually generated from among the plurality of sample texts.

According to one embodiment of the present invention, the clustering result of the clustering section 20 and a desired clustering result are compared, and when the comparison result shows, for example, disagreement, the categorizing sample data 30 can be changed by the input section 130 (changing unit). As a result, categorizing of the new text group 80 can be performed based on more complete categorizing sample data 30, thereby enabling greatly increase in the categorizing accuracy.

According to one embodiment of the present invention, the clustering result distribution data CB (see FIG. 14) is displayed on the display section 120, users can easily grasp the distribution of the categorizing result.

According to one embodiment of the present invention, the categorizing learning information 70A is regenerated based on the optimized categorizing result, as described in the modified example 2, and the new text group 80 is re-categorized based on the categorizing learning information 70A, thereby enabling improvement in the categorizing accuracy.

According to one embodiment of the present invention, the difference in the categorizing results between before and after the optimization is displayed as icons $I_1$ to $I_4$ (difference recognition information), so that a user can recognize the difference in one glance. As a result, the user can deal with it rapidly based on the difference, thereby enabling improvement in the categorizing accuracy.

One embodiment according to the present invention has been described in detail with reference to drawings, however, the specific construction examples are not limited to this one embodiment, and design modifications that do not depart from the gist of the present invention are included in the present invention. For example, in the above-described one embodiment, the information categorizing program for realizing the function of the information categorizing apparatus may be recorded onto a computer readable recording medium 400 shown in FIG. 17, and the information categorizing program recorded on the recording medium 400 is read and executed by the computer 300 shown in this figure, to thereby effect information categorizing.

Figure 17:
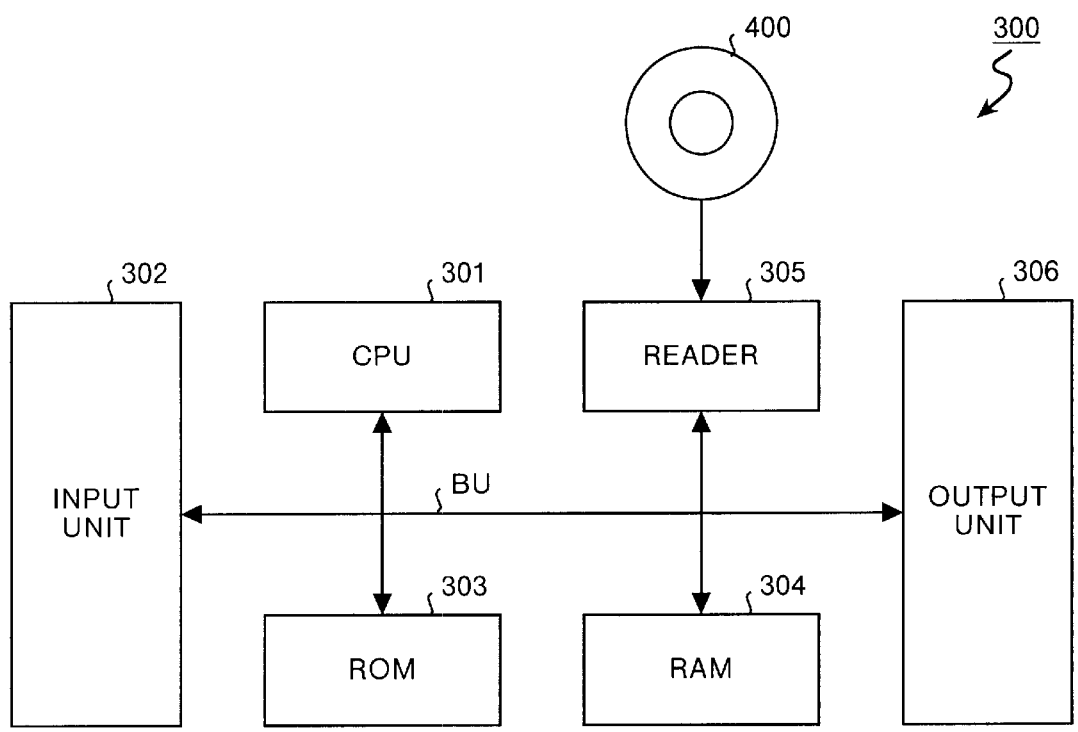
FIG. 17 is a block diagram showing a modified example 3 in one embodiment.

The computer 300 shown in FIG. 17 comprises: a CPU 301 for executing the information categorizing program; an input unit 302 such as a keyboard, a mouse and the like; ROM (Read Only Memory) 303 for storing various data; RAM (Random Access Memory) 304 for storing operation parameters or the like; a reader 305 for reading the information categorizing program from the recording medium 400; an output unit 306 such as a display, a printer and the like; and a bus BU for connecting each section of the apparatus.

The CPU 301 performs the above-described information categorization, by executing the information categorizing program, after reading the information categorizing program stored in the recording medium 400 via the reader 305. The recording medium 400 includes not only a portable recording medium such as an optical disk, a floppy disk and a hard disk, but also a transmission medium such as network, which temporarily records and holds the data.

Moreover, a case has been described above where a cross-validation method is adopted as an example of the categorizing method determination method in the categorizing method determination section 50 shown in FIG. 1, but the present invention is not limited to this method, and the categorizing method may be determined using a value of recall factor (a ratio of correct data included in the result) or relevance factor (less mistake in the result) as a key. In short, if only such requirements that a plurality of categorizing methods can be used, and that one having the highest categorizing accuracy can be selected from among these categorizing methods are satisfied, any method may be adopted within the scope of the present invention.

As described above, according to the information categorizing apparatus of one aspect of the present invention, a plurality of categorizing methods are kept in a usable condition, and after a categorizing method having the highest categorizing accuracy is determined by the categorizing method determination unit from among the plurality of categorizing methods, based on the categorizing sample information, a new text group is categorized for each category according to this categorizing method. As a result, there can be obtained such an effect that the categorizing accuracy can be increased compared to the conventional apparatus, regardless of the content and quantity of the information to be categorized.

Further, a plurality of feature element extraction methods are kept in a usable condition by the feature element extraction unit, and feature elements corresponding to these plurality of feature element extraction methods are respectively extracted, and in particular, a feature element corresponding to the feature element extraction method having the highest discrimination ability between categories is designated as the extraction result. As a result, there can be obtained such an effect that the categorizing accuracy of the categorizing result corresponding to this feature element can be further increased.

Further, since the editing unit is provided for enabling edit (deletion, addition, or the like) of the extracted feature element, there can be obtained such an effect that flexible feature element setting can be performed with respect to the category.

Further, a plurality of categorizing methods are kept in a usable condition, and after a categorizing method having the highest categorizing accuracy is determined by the categorizing method determination unit, by means of a cross-validation method, from among the plurality of categorizing methods based on the categorizing sample information, a new text group is categorized for each category according to this categorizing method. As a result, there can be obtained such an effect that the categorizing accuracy can be increased compared to the conventional apparatus, regardless of the content and quantity of the information to be categorized.

Further, since the area to be categorized in the categorizing sample information and the new text group is assigned by the assignment unit, an area unnecessary for categorizing can be excluded, and essentially necessary area can be categorized. As a result, there can be obtained such an effect that the categorizing accuracy can be further improved.

Further, since the categorizing sample information is generated by the clustering unit, there can be obtained such an effect that the efficiency can be greatly improved, and work load onto the user can be reduced, compared to a case where the category is manually generated from among the plurality of sample texts.

Further, the clustering result of the clustering unit and a desired clustering result are compared, and when the comparison result shows, for example, disagreement, the categorizing sample information can be changed by the changing unit. As a result, there can be obtained such an effect that categorizing of new text group can be performed based on more complete categorizing sample information, thereby enabling increase in the categorizing accuracy.

Further, since the clustering result is displayed by the clustering result display unit, there can be obtained such an effect that users can easily grasp the distribution of the categorizing result.

Further, since the categorizing learning information is regenerated based on the categorizing result optimized by the optimization means, and the new text group is re-categorized based on the categorizing learning information, there can be obtained such an effect that the categorizing accuracy can be further improved.

Further, the difference in the categorizing results between before and after the optimization is displayed as the difference recognition information, so that a user can recognize the difference in one glance. As a result, there can be obtained such an effect that the user can deal with it rapidly based on the difference, thereby enabling improvement in the categorizing accuracy.

According to the information categorizing method of the present invention, a plurality of categorizing methods are kept in a usable condition, and after a categorizing method having the highest categorizing accuracy is determined in the categorizing method determination step, from among the plurality of categorizing methods, based on the categorizing sample information, a new text group is categorized for each category according to this categorizing method. As a result, there can be obtained such an effect that the categorizing accuracy can be increased compared to the conventional method, regardless of the content and quantity of the information to be categorized.

A computer program which when executed on a computer realizes each and every step of the method according to the present invention is stored on a computer-readable recording medium. Accordingly, the method can be realized on a computer, easily and automatically.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information categorizing apparatus comprising:
   a feature element extraction unit which extracts a feature element for each category, respectively, from a plurality of sample texts included in the categorizing sample information in which the plurality of sample texts and a plurality of categories are associated with each other in advance;
   a categorizing method determination unit which determines a categorizing method having the highest categorizing accuracy among a plurality of categorizing methods, based on the categorizing sample information;
   a categorizing learning information generation unit which generates categorizing learning information representing a feature for each category, based on the feature element extracted by said feature element extraction unit, in accordance with the categorizing method determined by said categorizing method determination unit; and
   a categorizing unit which categorizes a new text group to be categorized for each category, in accordance with the categorizing method determined by said categorizing method determination unit and the categorizing learning information,
   wherein said categorizing method determination unit determines a categorizing method having the highest categorizing accuracy from among a plurality of categorizing methods by a cross-validation method.

2. The information categorizing apparatus according to claim 1, wherein said feature element extraction unit extracts a feature element respectively by a plurality of feature element extraction methods, and based on these extraction results, a feature element extraction method having the highest discrimination ability between categories is selected from among a plurality of feature element extraction methods, and a feature element corresponding to this selection result is made to be the extraction result.

3. The information categorizing apparatus according to claim 1 further comprising an editing unit which edits a feature element extracted by said feature element extraction unit.

4. The information categorizing apparatus according to claim 1 further comprising an assignment unit which assigns an area to be categorized in the categorizing sample information and the new text group.

5. The information categorizing apparatus according to claim 1 further comprising a clustering unit which clusters a plurality of sample texts to thereby generate the categorizing sample information in which the plurality of sample texts and the plurality of categories are associated with each other.

6. The information categorizing apparatus according to claim 1 further comprising,
   a clustering unit which clusters the categorizing sample information;
   a comparison unit which compares the clustering result of said clustering unit and a desired clustering result; and
   a changing unit which changes the categorizing sample information, according to need, based on the comparison result of said comparison unit.

7. The information categorizing apparatus according to claim 1 further comprising a clustering result display unit which clusters a new text group in the categorizing result of said categorizing unit and displaying the clustering result.

8. The information categorizing apparatus according to claim 1 further comprising an optimization unit which optimizes the categorizing result of said categorizing unit,
   wherein said categorizing learning information generation unit regenerates the categorizing learning information based on the optimized categorizing result, and said categorizing unit categorizes the new text group to be categorized for each category, according to the categorizing method determined by said categorizing method determination unit and the regenerated categorizing learning information.

9. The information categorizing apparatus according to claim 8 further comprising a difference recognition information display unit which displays the difference between the categorizing result before the optimization and the categorizing result after the optimization as visually recognizable difference recognition information.

10. An information categorizing method comprising:

extracting a feature element for each category, respectively, from a plurality of sample texts included in the categorizing sample information in which the plurality of sample texts and a plurality of categories are associated with each other in advance;

determining a categorizing method having the highest categorizing accuracy from among a plurality of categorizing methods, based on the categorizing sample information;

generating categorizing learning information representing a feature for each category, based on the feature element extracted, in accordance with the categorizing method determined; and categorizing a new text group to be categorized for each category, in accordance with the categorizing method determined and the categorizing learning information, wherein, the categorizing method having the highest categorizing accuracy is determined by a cross-validation method.

11. A computer readable medium for storing instructions, which when executed by a computer, causes the computer to perform:

extracting a feature element for each category, respectively, from a plurality of sample texts included in the categorizing sample information in which the plurality of sample texts and a plurality of categories are associated with each other in advance;

determining a categorizing method having the highest categorizing accuracy from among a plurality of categorizing methods, based on the categorizing sample information;

generating categorizing learning information representing a feature for each category, based on the feature element extracted, in accordance with the categorizing method determined; and categorizing a new text group to be categorized for each category, in accordance with the categorizing method determined and the categorizing learning information, wherein, the categorizing method having the highest categorizing accuracy is determined by a cross-validation method.

* * * * *

UNITED STATES PATENT AND TRADEMARK OFFICE
CERTIFICATE OF CORRECTION

PATENT NO. : 6,654,744 B2
DATED : November 25, 2003
INVENTOR(S) : Yoshinori Katayama et al.

It is certified that error appears in the above-identified patent and that said Letters Patent is hereby corrected as shown below:

<u>Title page,</u>
Item [54], change title to:
-- METHOD APARATUS AND A COMPUTER PRODUCT FOR CATEGORIZING INFORMATION --.

Signed and Sealed this

Thirtieth Day of March, 2004

JON W. DUDAS
*Acting Director of the United States Patent and Trademark Office*